(12) United States Patent
Olson et al.

(10) Patent No.: US 12,174,207 B2
(45) Date of Patent: Dec. 24, 2024

(54) BLOOD SAMPLE PREPARATION DEVICE AND METHODS

(71) Applicant: Babson Diagnostics, Inc., Austin, TX (US)

(72) Inventors: Eric Olson, Austin, TX (US); Kathryn Wong, Stamford, CT (US); Christopher Dipasquale, Nyack, NY (US); Scott Salmon, Tenafly, NJ (US); Steven Bellofatto, Closter, NJ (US); Steven Madsen, New York, NY (US); Courtney Nicholls, Cranston, RI (US)

(73) Assignee: Babson Diagnostics, Inc., Austin, TX (US)

( * ) Notice: Subject to any disclaimer, the term of this patent is extended or adjusted under 35 U.S.C. 154(b) by 0 days.

(21) Appl. No.: 18/300,971

(22) Filed: Apr. 14, 2023

(65) Prior Publication Data

US 2024/0345113 A1    Oct. 17, 2024

Related U.S. Application Data

(63) Continuation of application No. 16/349,925, filed as application No. PCT/US2017/061596 on Nov. 14, 2017, now abandoned.

(Continued)

(51) Int. Cl.
*G01N 35/00* (2006.01)
*G01N 35/04* (2006.01)

(52) U.S. Cl.
CPC .......... *G01N 35/00732* (2013.01); *G01N 2035/00445* (2013.01); *G01N 2035/00752* (2013.01);

(Continued)

(58) Field of Classification Search
CPC ... G01N 35/00732; G01N 2035/00445; G01N 2035/00752; G01N 2035/00831; G01N 2035/0441
See application file for complete search history.

(56) References Cited

U.S. PATENT DOCUMENTS 1,892,884 A    1/1933    Grauman et al.
2,110,237 A    3/1938    Parsons
(Continued)

FOREIGN PATENT DOCUMENTS

CA    2058917 A1    7/1993
CN    1501080 A    6/2004
(Continued)

OTHER PUBLICATIONS

Chinese Office Action for Application No. CN201780083377 dated Mar. 4, 2022, 21 pages.
(Continued)

*Primary Examiner* — Jill A Warden
*Assistant Examiner* — John McGuirk
(74) *Attorney, Agent, or Firm* — COOLEY LLP

(57) ABSTRACT

The present disclosure relates to blood sample preparation devices and methods. In some embodiments, a method for preparing a blood sample comprises: receiving at a sample preparation machine a sample container containing the blood sample; scanning an identifier of the sample container, the identifier containing information indicative of a characteristic of at least one of the sample container or the blood sample contained therein, actuating, after the scanning, and based on the information, the sample container to repeatedly change a position of the sample container; determining, based on the information, whether the sample container should be centrifuged; and transporting the sample container to a centrifuge to be centrifuged and then to a storage (Continued)

compartment when the determining indicates that the sample container should be centrifuged, and to the storage compartment without entering the centrifuge when the determining indicates that the sample container should not be centrifuged.

29 Claims, 9 Drawing Sheets

Related U.S. Application Data

(60) Provisional application No. 62/421,802, filed on Nov. 14, 2016.

(52) U.S. Cl.
CPC .............. *G01N 2035/00831* (2013.01); *G01N 2035/0441* (2013.01)

(56) References Cited

U.S. PATENT DOCUMENTS

| | | |
|---|---|---|
| 2,240,101 A | 4/1941 | Smith |
| 2,722,257 A | 11/1955 | Lockhart |
| 2,775,350 A | 12/1956 | Jones |
| 2,896,502 A | 7/1959 | Nordin |
| 2,912,895 A | 11/1959 | Houston et al. |
| 3,081,029 A | 3/1963 | Gauslaa |
| 3,300,051 A | 1/1967 | Mitchell |
| 3,326,400 A | 6/1967 | Hamelin |
| 3,419,179 A | 12/1968 | Deuschle |
| 3,420,107 A | 1/1969 | Rowett et al. |
| 3,434,859 A | 3/1969 | Benjamin et al. |
| 3,478,889 A | 11/1969 | Fessler et al. |
| 3,481,712 A | 12/1969 | Bernstein et al. |
| 3,508,653 A | 4/1970 | Coleman et al. |
| 3,525,254 A | 8/1970 | Milanes et al. |
| 3,539,300 A | 11/1970 | Stone et al. |
| 3,611,403 A | 10/1971 | Gilford et al. |
| 3,615,222 A | 10/1971 | Mead |
| 3,626,929 A | 12/1971 | Sanz et al. |
| 3,654,925 A | 4/1972 | Holderith |
| 3,684,455 A | 8/1972 | Vacirca et al. |
| 3,701,434 A | 10/1972 | Moore |
| 3,706,305 A | 12/1972 | Berger et al. |
| 3,706,306 A | 12/1972 | Berger et al. |
| 3,733,179 A | 5/1973 | Guehler et al. |
| 3,750,645 A | 8/1973 | Bennett et al. |
| 3,761,408 A | 9/1973 | Jae et al. |
| 3,768,979 A | 10/1973 | Mead et al. |
| 3,780,935 A | 12/1973 | Lukacs et al. |
| 3,786,985 A | 1/1974 | Blaivas |
| 3,814,248 A | 6/1974 | Lawhead |
| 3,818,188 A | 6/1974 | Hertel et al. |
| 3,849,072 A | 11/1974 | Ayres |
| 3,852,194 A | 12/1974 | Zine, Jr. |
| 3,862,042 A | 1/1975 | Ayres |
| 3,879,295 A | 4/1975 | Glover et al. |
| 3,920,549 A | 11/1975 | Gigliello et al. |
| 3,926,521 A | 12/1975 | Ginzel |
| 3,928,139 A | 12/1975 | Dorn |
| 3,929,646 A | 12/1975 | Adler |
| 3,931,010 A | 1/1976 | Ayres et al. |
| 3,938,953 A | 2/1976 | Paschalis et al. |
| 3,939,822 A | 2/1976 | Markowitz |
| 3,942,717 A | 3/1976 | Robison |
| 3,958,944 A | 5/1976 | Wong |
| 3,972,812 A | 8/1976 | Gresl, Jr. |
| 3,985,649 A | 10/1976 | Eddelman |
| 3,999,868 A | 12/1976 | Sanz et al. |
| 4,012,325 A | 3/1977 | Columbus |
| 4,046,699 A | 9/1977 | Zine, Jr. |
| 4,050,451 A | 9/1977 | Columbus |
| 4,052,320 A | 10/1977 | Jakubowicz |
| 4,055,501 A | 10/1977 | Cornell |
| D246,800 S | 12/1977 | Wong |
| 4,081,356 A | 3/1978 | Zierdt |
| 4,083,788 A | 4/1978 | Ferrara |
| 4,088,582 A | 5/1978 | Murty et al. |
| 4,092,113 A | 5/1978 | Hardy |
| 4,131,512 A | 12/1978 | Dorn |
| 4,131,549 A | 12/1978 | Ferrara |
| 4,132,225 A | 1/1979 | Whattam |
| 4,136,036 A | 1/1979 | Columbus |
| 4,147,628 A | 4/1979 | Bennett et al. |
| 4,154,690 A | 5/1979 | Ballies |
| 4,164,449 A | 8/1979 | Dorn et al. |
| 4,169,060 A | 9/1979 | Columbus |
| 4,180,465 A | 12/1979 | Murty |
| 4,227,620 A | 10/1980 | Conway |
| 4,235,725 A | 11/1980 | Semersky |
| 4,257,886 A | 3/1981 | Kessler |
| 4,294,707 A | 10/1981 | Ikeda et al. |
| 4,295,974 A | 10/1981 | Cornell |
| 4,308,232 A | 12/1981 | Crouther et al. |
| 4,358,425 A | 11/1982 | Finney et al. |
| 4,369,117 A | 1/1983 | White |
| 4,417,981 A | 11/1983 | Nugent |
| 4,425,235 A | 1/1984 | Cornell et al. |
| 4,426,290 A | 1/1984 | Ichikawa et al. |
| 4,443,408 A | 4/1984 | Mintz |
| 4,513,522 A | 4/1985 | Selenke |
| 4,591,486 A | 5/1986 | Eberle |
| 4,671,939 A | 6/1987 | Mintz |
| 4,678,559 A | 7/1987 | Szabados |
| 4,735,904 A | 4/1988 | Starr |
| 4,755,356 A | 7/1988 | Robbins et al. |
| 4,762,798 A | 8/1988 | Deutsch |
| 4,775,626 A | 10/1988 | Armenta et al. |
| 4,799,358 A | 1/1989 | Knopf et al. |
| 4,805,772 A | 2/1989 | Shaw et al. |
| 4,811,866 A | 3/1989 | Golias |
| 4,832,678 A | 5/1989 | Sheeran |
| 4,957,707 A | 9/1990 | Hofelich et al. |
| 5,019,243 A | 5/1991 | McEwen et al. |
| 5,030,341 A | 7/1991 | McEwen et al. |
| 5,090,420 A | 2/1992 | Nielsen |
| 5,103,651 A | 4/1992 | Coelho et al. |
| 5,104,533 A | 4/1992 | Szabados |
| 5,151,184 A | 9/1992 | Ferkany |
| 5,236,604 A | 8/1993 | Fiehler |
| 5,275,731 A | 1/1994 | Jahn |
| 5,290,703 A | 3/1994 | Hsu et al. |
| 5,316,146 A | 5/1994 | Graff |
| 5,352,410 A | 10/1994 | Hansen et al. |
| 5,501,841 A | 3/1996 | Lee et al. |
| 5,556,544 A | 9/1996 | Didier |
| 5,614,236 A | 3/1997 | Klang |
| 5,632,905 A | 5/1997 | Haynes |
| 5,665,309 A | 9/1997 | Champseix et al. |
| 5,683,659 A | 11/1997 | Hovatter |
| 5,830,154 A | 11/1998 | Goldstein et al. |
| 5,882,318 A | 3/1999 | Boyde |
| 5,882,943 A | 3/1999 | Aldeen |
| 5,975,313 A | 11/1999 | Sarstedt |
| 6,043,878 A | 3/2000 | Gratzl et al. |
| 6,132,353 A | 10/2000 | Winkelman et al. |
| 6,171,261 B1 | 1/2001 | Niermann et al. |
| 6,221,655 B1 | 4/2001 | Fung et al. |
| 6,234,948 B1 | 5/2001 | Yavilevich |
| 6,270,728 B1 | 8/2001 | Wijnschenk et al. |
| 6,296,763 B1 | 10/2001 | Hicks |
| 6,344,331 B1 | 2/2002 | Ball et al. |
| 6,471,069 B2 | 10/2002 | Lin et al. |
| 6,497,325 B1 | 12/2002 | DiCesare et al. |
| 6,730,071 B1 | 5/2004 | Dassa |
| 6,793,885 B1 | 9/2004 | Yokoi et al. |
| 7,176,034 B2 | 2/2007 | Efthimiadis et al. |
| 7,638,342 B2 | 12/2009 | Samsoondar |
| 7,736,593 B2 | 6/2010 | Dastane et al. |
| 8,343,426 B2 | 1/2013 | Song |
| 8,550,273 B2 | 10/2013 | Levin et al. |
| 8,632,740 B2 | 1/2014 | Dastane et al. |

(56) References Cited

U.S. PATENT DOCUMENTS

| | | | |
|---|---|---|---|
| 8,852,505 B2 | 10/2014 | Dupoteau et al. |
| 9,251,393 B2 | 2/2016 | Pollack |
| 9,279,760 B2 | 3/2016 | Imazu et al. |
| 9,488,563 B2 | 11/2016 | Halverson et al. |
| 9,604,219 B2 | 3/2017 | Mortillaro et al. |
| 10,336,539 B2 | 7/2019 | Caveney et al. |
| 10,870,110 B2 | 12/2020 | Olson |
| 11,697,114 B2 | 7/2023 | Olson |
| 2001/0025818 A1 | 10/2001 | Warner |
| 2002/0040872 A1 | 4/2002 | Bogoev et al. |
| 2002/0066712 A1 | 6/2002 | Brockwell |
| 2002/0155619 A1 | 10/2002 | Kurihara et al. |
| 2003/0091701 A1 | 5/2003 | Yahav |
| 2003/0209091 A1 | 11/2003 | Fattinger et al. |
| 2004/0005246 A1 | 1/2004 | Efthimiadis et al. |
| 2004/0059255 A1 | 3/2004 | Manoussakis et al. |
| 2004/0129631 A1 | 7/2004 | Anraku et al. |
| 2005/0014273 A1 | 1/2005 | Dahm et al. |
| 2005/0059163 A1 | 3/2005 | Dastane et al. |
| 2005/0123444 A1 | 6/2005 | Tomasso et al. |
| 2005/0132775 A1 | 6/2005 | Laugharn, Jr. et al. |
| 2006/0009713 A1 | 1/2006 | Flaherty |
| 2006/0142669 A1 | 6/2006 | Morimoto et al. |
| 2006/0168985 A1 | 8/2006 | Gano |
| 2007/0020629 A1 | 1/2007 | Ross et al. |
| 2007/0048185 A1 | 3/2007 | Dupoteau et al. |
| 2007/0073187 A1 | 3/2007 | Thomson et al. |
| 2007/0083131 A1 | 4/2007 | Escutia et al. |
| 2007/0110627 A1 | 5/2007 | Nagai et al. |
| 2007/0231834 A1 | 10/2007 | Hale |
| 2008/0003148 A1 | 1/2008 | Dause |
| 2008/0096282 A1 | 4/2008 | Samsoondar |
| 2008/0185349 A1 | 8/2008 | Wlllliams |
| 2008/0213377 A1 | 9/2008 | Bhatia et al. |
| 2008/0237115 A1 | 10/2008 | Shintani et al. |
| 2008/0286150 A1 | 11/2008 | Pankow |
| 2008/0313877 A1 | 12/2008 | Campbell |
| 2009/0257922 A1 | 10/2009 | Baker |
| 2010/0062415 A1 | 3/2010 | Schwoebel et al. |
| 2010/0111773 A1 | 5/2010 | Pantelidis |
| 2010/0114056 A1 | 5/2010 | Nagai |
| 2010/0261988 A1 | 10/2010 | Tamir |
| 2010/0288060 A1 | 11/2010 | Ronsick et al. |
| 2010/0291619 A1 | 11/2010 | Robinson et al. |
| 2010/0294050 A1 | 11/2010 | Massaro |
| 2010/0297659 A1 | 11/2010 | Yoo |
| 2010/0303688 A1 | 12/2010 | Andersen |
| 2011/0263408 A1 | 10/2011 | Suto et al. |
| 2012/0048002 A1 | 3/2012 | Mallet |
| 2012/0048827 A1 | 3/2012 | Levin |
| 2012/0053041 A1 | 3/2012 | Ihm et al. |
| 2012/0058027 A1 | 3/2012 | Song |
| 2012/0258531 A1 | 10/2012 | Seubert et al. |
| 2013/0045477 A1 | 2/2013 | Harder et al. |
| 2013/0045852 A1 | 2/2013 | Chapman et al. |
| 2013/0125628 A1 | 5/2013 | Kitagawa et al. |
| 2013/0167768 A1 | 7/2013 | Smith et al. |
| 2013/0209985 A1 | 8/2013 | Hoke et al. |
| 2013/0224851 A1 | 8/2013 | Ljungmann et al. |
| 2013/0280130 A1 | 10/2013 | Sarwar et al. |
| 2013/0323711 A1 | 12/2013 | Singh et al. |
| 2014/0065018 A1 | 3/2014 | Imazu et al. |
| 2014/0073990 A1 | 3/2014 | Holmes et al. |
| 2014/0096598 A1 | 4/2014 | Halverson et al. |
| 2014/0105796 A1 | 4/2014 | Nagy |
| 2014/0113278 A1 | 4/2014 | Thomas et al. |
| 2014/0241957 A1 | 8/2014 | Serhan et al. |
| 2014/0255254 A1 | 9/2014 | Yamaguchi et al. |
| 2014/0273242 A1 | 9/2014 | Ochranek et al. |
| 2014/0296089 A1 | 10/2014 | Holmes et al. |
| 2014/0356254 A1 | 12/2014 | Lee et al. |
| 2014/0374480 A1 | 12/2014 | Pollack |
| 2015/0018715 A1 | 1/2015 | Walterspiel |
| 2015/0056716 A1 | 2/2015 | Oyler et al. |
| 2015/0072346 A1 | 3/2015 | Gellibolian et al. |
| 2015/0111299 A1 | 4/2015 | Watabe et al. |
| 2015/0151294 A1 | 6/2015 | Cho et al. |
| 2015/0289856 A1 | 10/2015 | Saqi et al. |
| 2015/0316532 A1 | 11/2015 | Makino et al. |
| 2016/0018427 A1* | 1/2016 | Streibl ............... G01F 23/2921 702/19 |
| 2016/0097049 A1 | 4/2016 | Qian |
| 2016/0271015 A1 | 9/2016 | Wengreen et al. |
| 2018/0028102 A1 | 2/2018 | George et al. |
| 2018/0259251 A1 | 9/2018 | Poorte et al. |
| 2018/0326413 A1 | 11/2018 | Walkowiak et al. |
| 2018/0353952 A1 | 12/2018 | Olson |
| 2019/0072578 A1 | 3/2019 | Buschke |
| 2019/0145688 A1 | 5/2019 | Tsuno |
| 2019/0320960 A1 | 10/2019 | Olson et al. |
| 2019/0331703 A1 | 10/2019 | Olson et al. |
| 2019/0350808 A1 | 11/2019 | Olson et al. |
| 2020/0150005 A1 | 5/2020 | Slutter et al. |
| 2020/0261308 A1 | 8/2020 | Zhou |
| 2020/0363116 A1 | 11/2020 | Van Bokkelen et al. |
| 2021/0015699 A1 | 1/2021 | Zou et al. |
| 2021/0039088 A1 | 2/2021 | Olson |
| 2021/0063062 A1 | 3/2021 | Alexander et al. |
| 2021/0123936 A1 | 4/2021 | Swanson et al. |
| 2022/0049890 A1 | 2/2022 | Alexander et al. |
| 2022/0117778 A1 | 4/2022 | Knotts |
| 2022/0349910 A1 | 11/2022 | Silbert et al. |
| 2023/0074188 A1 | 3/2023 | Luo et al. |
| 2023/0324425 A1 | 10/2023 | Flanagan et al. |
| 2024/0042427 A1 | 2/2024 | Olson |

FOREIGN PATENT DOCUMENTS

| | | |
|---|---|---|
| CN | 1690714 A | 11/2005 |
| CN | 1826530 A | 8/2006 |
| CN | 1856366 A | 11/2006 |
| CN | 1863495 A | 11/2006 |
| CN | 101311700 A | 11/2008 |
| CN | 101312689 A | 11/2008 |
| CN | 101454665 A | 6/2009 |
| CN | 101678931 A | 3/2010 |
| CN | 201454557 U | 5/2010 |
| CN | 102033007 A | 4/2011 |
| CN | 102209896 A | 10/2011 |
| CN | 102764133 A | 11/2012 |
| CN | 102933949 A | 2/2013 |
| CN | 103123317 A | 5/2013 |
| CN | 103308376 A * | 9/2013 |
| CN | 103354765 A | 10/2013 |
| CN | 103393427 A | 11/2013 |
| CN | 103608658 A | 2/2014 |
| CN | 103674672 A | 3/2014 |
| CN | 104034672 A | 9/2014 |
| CN | 104107054 A | 10/2014 |
| CN | 203965173 U | 11/2014 |
| CN | 104768516 A | 7/2015 |
| CN | 105600468 A | 5/2016 |
| CN | 108743197 A | 11/2018 |
| CN | 114159058 A | 3/2022 |
| EP | 0494845 A1 | 7/1992 |
| EP | 1005910 A2 | 6/2000 |
| EP | 1161923 A1 | 12/2001 |
| EP | 1542020 A2 | 6/2005 |
| EP | 1884188 A1 | 2/2008 |
| EP | 2726842 A1 | 5/2014 |
| EP | 3603813 A2 | 2/2020 |
| EP | 3888721 A1 | 10/2021 |
| FR | 2582013 A1 | 11/1986 |
| JP | S4851686 A | 7/1973 |
| JP | S4841632 B1 | 12/1973 |
| JP | H03181852 A | 8/1991 |
| JP | H0526883 A | 2/1993 |
| JP | H0821839 A | 1/1996 |
| JP | H09166591 A | 6/1997 |
| JP | H1033507 A | 2/1998 |
| JP | H10243940 A | 9/1998 |
| JP | H10277019 A | 10/1998 |
| JP | H1183864 A | 3/1999 |
| JP | H11318870 A | 11/1999 |

(56) References Cited

FOREIGN PATENT DOCUMENTS

| | | | |
|---|---|---|---|
| JP | 2000084389 A | 3/2000 | |
| JP | 2001502595 A | 2/2001 | |
| JP | 2001264344 A | 9/2001 | |
| JP | 2007503580 A | 2/2007 | |
| JP | 2007271388 A | 10/2007 | |
| JP | 2008506128 A | 2/2008 | |
| JP | 2008099991 A | 5/2008 | |
| JP | 2008191070 A | 8/2008 | |
| JP | 2009507237 A | 2/2009 | |
| JP | 2009089759 A | 4/2009 | |
| JP | 2012527613 A | 11/2012 | |
| JP | 2014048112 A | 3/2014 | |
| JP | 2014173904 A | 9/2014 | |
| JP | 2015509202 A | 3/2015 | |
| WO | WO-8505048 A1 | 11/1985 | |
| WO | WO-9839650 A1 | 9/1998 | |
| WO | WO-0170403 A1 | 9/2001 | |
| WO | WO-2005014173 A1 | 2/2005 | |
| WO | WO-2008027319 A2 | 3/2008 | |
| WO | WO-2008119947 A1 | 10/2008 | |
| WO | WO-2013003308 A1 | 1/2013 | |
| WO | WO-2014050021 A1 | 4/2014 | |
| WO | WO-2017100798 A1 | 6/2017 | |
| WO | WO-2018090023 A1 | 5/2018 | |
| WO | WO-2018090027 A1 | 5/2018 | |
| WO | WO-2018090030 A2 | 5/2018 | |
| WO | WO-2019006349 A1 | 1/2019 | |

OTHER PUBLICATIONS

International Search Report mailed Feb. 2, 2018 in corresponding PCT Application No. PCT/US2017/061596, 3 pages.
Non-Final Office Action for U.S. Appl. No. 16/349,925, dated Mar. 10, 2023, 40 pages.
Office Action for Chinese Application No. 201780083377, mailed Sep. 1, 2022, 18 pages.
Office Action for Japanese Application No. JP2019525902, mailed Jan. 20, 2022, 5 pages with English Translation.
Final Office Action for U.S. Appl. No. 16/349,925 dated Sep. 26, 2023, 55 pages.
International Search Report and Written Opinion mailed Sep. 8, 2023 in corresponding PCT Application No. PCT/US2023/065465, 9 pages.
Restriction Requirement for U.S. Appl. No. 18/300,757 dated Sep. 1, 2023, 7 pages.
European Communication for Application No. 17870446.6 dated Dec. 5, 2023, 6 pages.
Non-Final Office Action for U.S. Appl. No. 18/300,757 dated Nov. 15, 2023, 20 pages.
Non-Final Office Action for U.S. Appl. No. 18/300,971 dated Aug. 30, 2023, 27 pages.
Non-Final Office Action for U.S. Appl. No. 18/300,971 dated Nov. 28, 2023, 24 pages.
Restriction Requirement for U.S. Appl. No. 18/300,971 dated Jun. 28, 2023, 7 pages.

* cited by examiner

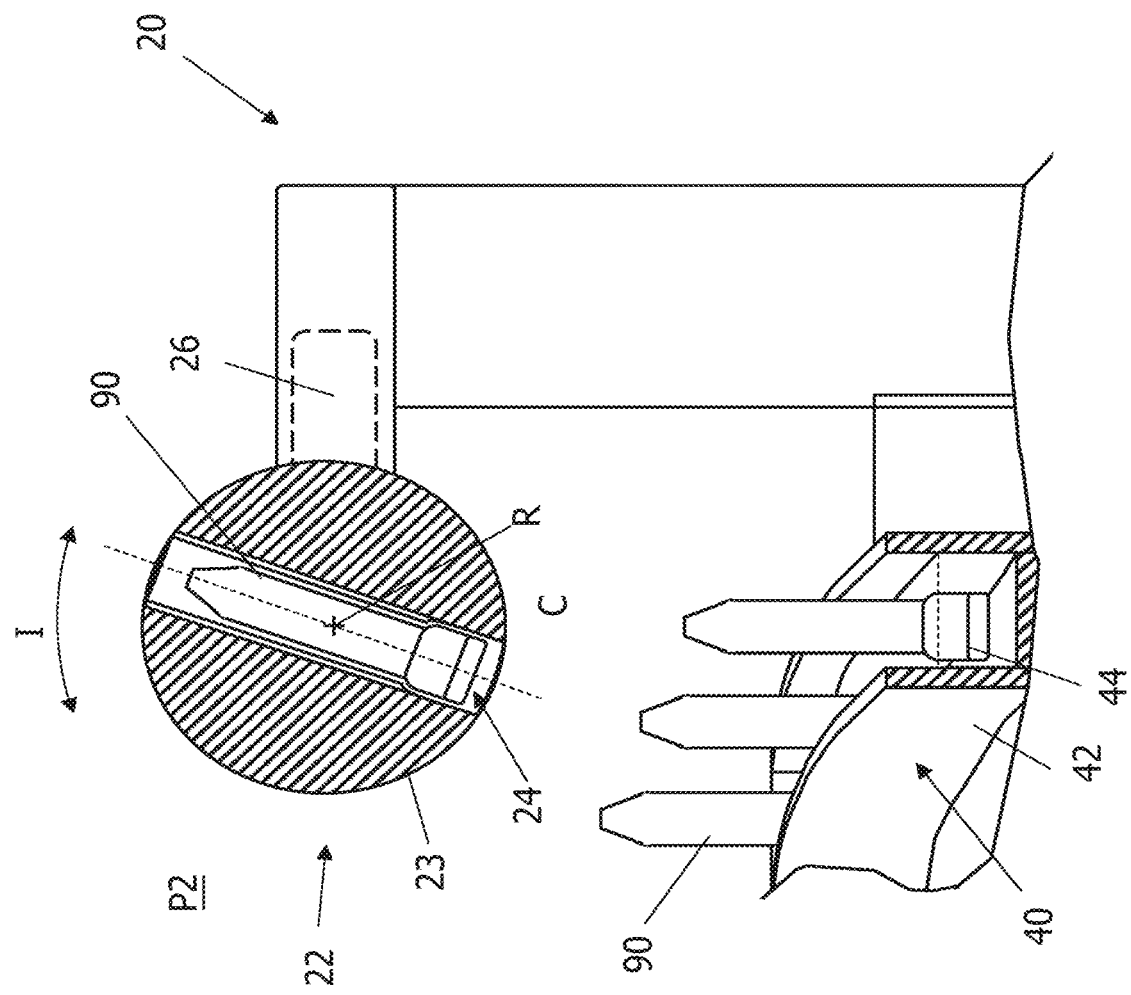

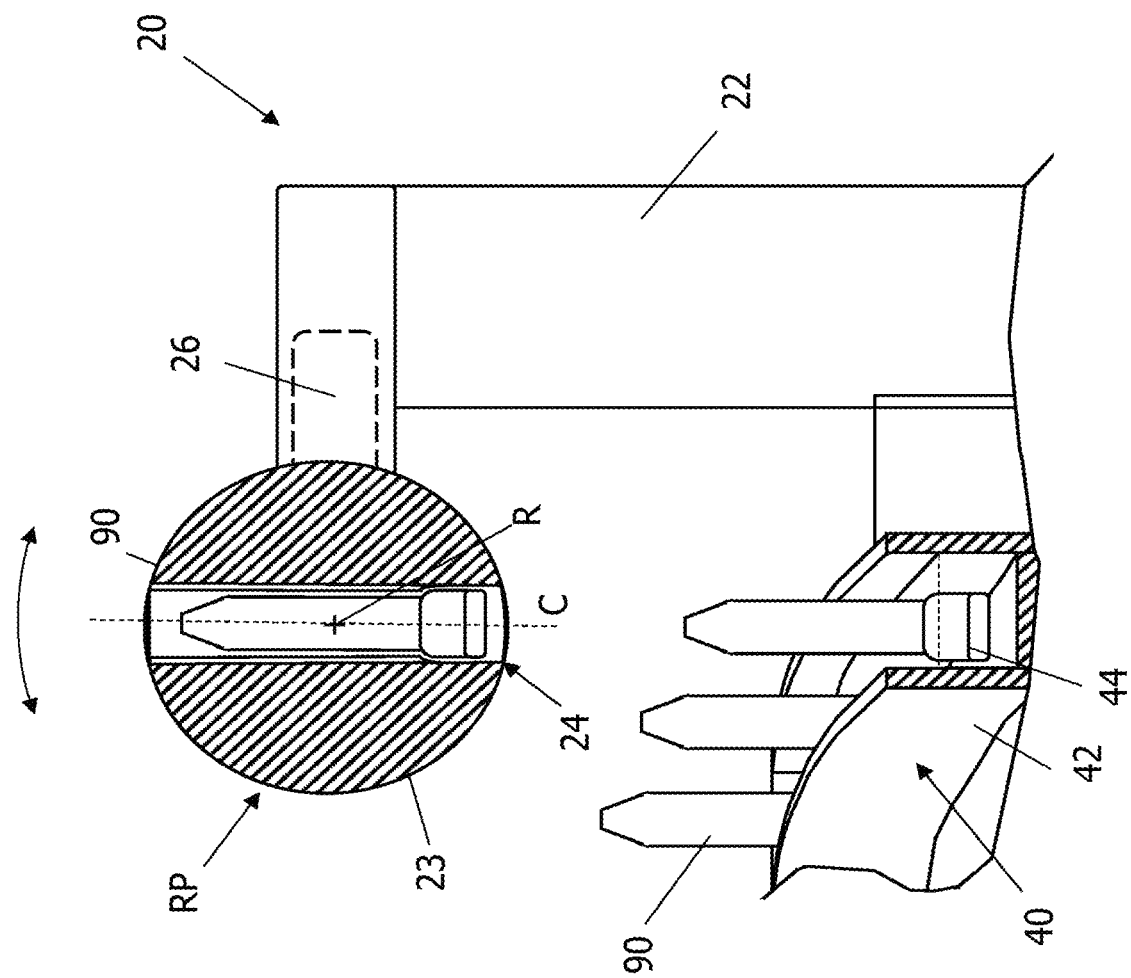

BLOOD SAMPLE PREPARATION DEVICE AND METHODS

CROSS-REFERENCE TO RELATED APPLICATIONS

This application is a Continuation of U.S. patent application Ser. No. 16/349,925, filed on May 14, 2019, which is a U.S. National Phase Application filed under 35 U.S.C. § 371 of International Application No. PCT/US2017/061596, filed Nov. 14, 2017, which claims priority to and the benefit of U.S. Provisional Application No. 62/421,802, filed Nov. 14, 2016, the contents of which are hereby incorporated by reference in their entireties.

TECHNICAL FIELD

The present disclosure relates to a sample preparation device, and in particular to a sample preparation device for preparing blood samples for testing.

BACKGROUND

Collecting blood for use in clinical diagnostics is complex. Typically, medical professionals must complete a number of steps to prepare and stabilize the specimens until they are picked up by the laboratory for analysis. These steps introduce a number of opportunities for errors which can impact patient care. In general, sample preparation includes manually inverting sample containers (or sample tubes). Different tube types may need to be inverted a specific number of times after collection in order to mix the blood with any chemical additives in the specimen container. The requirements for inversion vary, which can cause confusion and mistakes.

Sample preparation also involves waiting for serum tubes to clot. For instance, before centrifuging a serum container, it must be given time to clot. The collection technician may become impatient and centrifuge too early, or may become distracted and centrifuge too late. If the container is centrifuged too early, latent fibrin formation may cause diagnostic errors. If the container is centrifuged too late, the turnaround time may be slower which could impact patient care. These can go undetected if the collection technician does not record the time between collection and centrifugation. GP44, "Procedures for the Handling and Processing of Blood Specimens for Common Laboratory Tests," 4th Edition, published May 25, 2010 by the Clinical and Laboratory Standards Institute (CLSI), hereafter referred to as the "CLSI-GP44 standard", illustrate examples of the complexities of clotting.

Another sample preparation step involves centrifuging serum and plasma tubes. Serum or plasma containers need to be centrifuged in order to separate the liquid portion of the blood from the cells prior to analysis. The longer samples wait before being centrifuged, the longer the cells remain in contact with the serum or plasma, and the greater the opportunity for analytical error. The amount of time after which analytes become compromised differs, as illustrated by examples from the CLSI-GP44 standard. For instance, according to the CLSI-GP44 standard: potassium in serum is stable up to 2 hours; insulin in plasma is stable up to 6 hours; iron in serum is stable up to 8 hours; free thyroxine (t4) in serum is stable up to 24 hours; and cholesterol in serum is stable up to 48 hours.

Sample preparation also involves sorting tubes by type. Tubes may be sorted into different containers depending on the type of tube or depending on the laboratory to which it will be sent. This is done manually or not at all. Furthermore, in some cases, tubes may need to be stored at a fixed temperature after collection. For instance, they may be stored at room temperature, refrigerated, or frozen at varying temperatures.

Healthcare providers use written procedures and formal employee training to reduce the likelihood and impact of errors related to the specimen preparation method described above. In some cases, these procedures and require the person collecting blood to have formal phlebotomy training and/or a phlebotomy license. Because of the high number of different tube types and the different handling procedures for each, healthcare providers often use visual aids to remind staff how to handle each tube type. This can be done using poster-sized wall charts that serve as a quick reference. It can also be implemented in the information systems used by the collection technicians, to remind them how to prepare each individual specimen. Collection technicians can also use tuners to remind them when it's time to centrifuge or store a sample. The timer may be a stopwatch, a kitchen timer, a centrifuge timer, or a mobile device. These procedures are not failsafe and errors still occur. There is a need for advanced sample preparation systems that can minimize errors and complexities in this field.

SUMMARY

An embodiment of the present disclosure is sample preparation device. The sample preparation device includes a sample preparation module having a holder configured to hold the sample container, and an actuator coupled to the holder. The actuator is configured to cause the holder to repeatedly change a position of the sample container a set number of times when the sample container is held by the holder. The sample preparation device also includes a staging module configured to hold the sample container for a set period of time. The staging module includes a rack that holds the sample container when the sample container is released from the holder. The set period of time is sufficient to allow the blood in the sample container to further clot.

Another embodiment of the present disclosure is a method for preparing a blood sample. The method includes holding a sample container with a holder of a sample preparation module. The method also includes actuating the holder while holding the sample container to repeatedly change a position of the sample container in order to initiate clotting of blood in the sample container. The method includes releasing the sample container from the holder. The method also includes staging the sample container in a staging module for a set period of time, wherein the set period of time is sufficient to allow the blood in the sample container to clot.

BRIEF DESCRIPTION OF THE DRAWINGS

The foregoing summary, as well as the following detailed description, will be better understood when read in conjunction with the appended drawings. The drawings show illustrative embodiments of the disclosure. It should be understood, however, that the application is not limited to the precise arrangements and instrumentalities shown.

FIG. 5B is a schematic partial cross-section of a portion of the sample preparation device shown in in FIG. 5A, illustrating the sample container inverted;

FIG. 5C is a schematic partial cross-section of a portion of the sample preparation device shown in in FIG. 5B, illustrating the sample container positioned for placement into the staging module;

DETAILED DESCRIPTION OF ILLUSTRATIVE EMBODIMENTS

Figure 1:
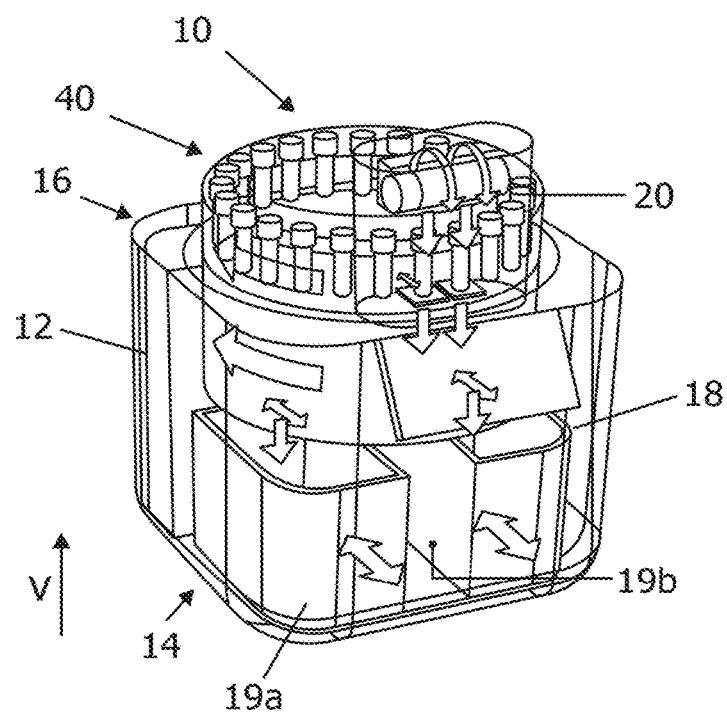
FIG. 1 is a top perspective view of a sample preparation device according to an embodiment of the present disclosure.

Referring to FIGS. 1-3 and 5A-5C, embodiments of the present disclosure include a sample preparation device 10 that can prepare samples for testing and analysis via a test analyzer (not shown). The sample preparation device 10 includes a sample preparation module 20, a sample staging module 40, a scanning module 60, and a sample centrifugation module 70. The sample preparation device 10 also includes a controller 80 that is configured to control operation of the various components of the sample preparation device 10 described above. The sample preparation device 10 is configured to prepare biological samples, such as blood, contained with sample containers 90. Although the description below refers to blood samples, the sample preparation device 10 may be used to process other biological samples. The sample preparation device 10 is designed to process sample containers 90 in order to facilitate analysis of the blood sample, such as, for example, by initiating clotting, centrifuging the samples, etc. Processing of the blood samples via the sample preparation device 10 will be described below with reference to each module.

Figure 8:
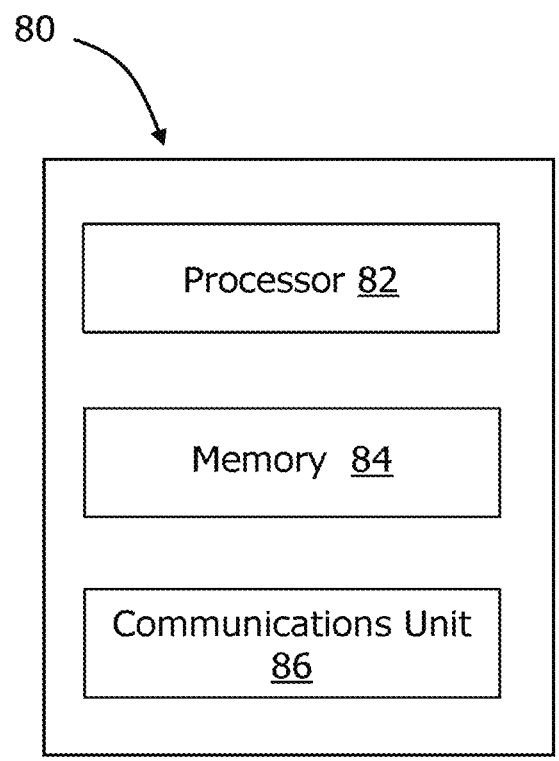
FIG. 8 is a schematic block diagram of the controller for the sample preparation device shown in FIG. 1.

Referring to FIG. 8, the controller 80 is used to control various operations of the sample preparation device 10. As illustrated, the controller 80 includes one or more processors 82, memory 84, and a communications unit 86. The processor 82 can execute instructions stored in the memory 84 in response to various inputs received from the modules 20, 40, 60, and 70 via the communications unit 86. The communications unit 86 can, in turn, transmit command signals to the modules that cause each module to execute an action or response as will be further described below.

Turning back to FIGS. 1-3, the sample preparation device 10 includes a device housing 12 that contains modules 20, 40, 60, 70 and the controller 80. It is, however, not essential that each module 20, 40, 60, 70 and controller 80 be contained by the device housing 12. As shown, the device housing 12 has a base 14, a top 16 spaced opposite the base 14 along a vertical direction V, and side walls 18 that extend from the base 14 toward the top 16. The device housing 12 includes mechanized doors (not numbered) that open to various storage compartments 19a and 19b into which the sample containers 90 are placed after a particular operation is completed. One or two compartments may be used or more than two compartments may be used. The compartments 19a and/or 19b may be refrigerated compartments. Alternatively, the storage compartments may be maintained at room temperature without temperature control.

Figure 4:
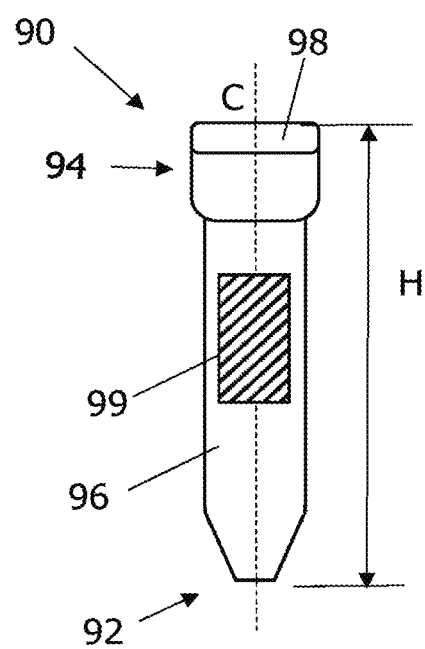
FIG. 4 is a side view the sample container shown in FIG. 1.

Referring now to FIG. 4, the sample container 90 is configured to hold a sample of the biological fluid, such as blood. The sample container 90 has a lower end 92, an upper end 94, and a sidewall 96 that extends from the lower end 92 to the upper end 94. The sample container 90 extends along a central axis C, and has a height H that extends from the lower end 92 to the upper end 94 along the central axis C. The sample container 90 defines an internal volume that holds the biological fluid. In one example, the internal volume is sufficient to hold between 100 to 1000 μl of blood. In one example, the volume is between 300 and 600 μl. In another example, the volume is between 200 and 300 μl. For instance, the sample container 90 is sized to hold a microsample. However, in other embodiments, the sample container is sized to hold larger amounts of blood. For instance, the internal volume is sufficient to hold between 1 ml up 1000 ml of blood. As shown, the sample container 90 includes a cap 98 that can close off the upper end 94 of the sample container 90. The sample container 90 may be at least partially transparent. In one example, the sample container 90 may be formed of glass. In another example, the sample container 90 is a polymeric material.

Continuing with FIG. 4, the sample container 90 may also include an identifier 99 disposed along the sidewall 96. The identifier 99 has information encoded therein related to the sample container and the sample contained therein. The identifier 99 may be any machine readable image or design element positioned on the sample container 90. In one example, the identifier can be a code, an alphanumeric code, a bar code, a QR code, design image, or other element that is machine readable by the scanning module. The identifier 99 may be an electronic code that can be associated with collection of information concerning the sample. The information includes a wide range of information associated with the sample being tested. For instance, the information may include, but is not limited to, sample type, sample tube type, sample volume, patient identifier, patient date of birth, hospital number, social security number, requisition number, accession number, a unique random number, a planned test module, laboratory conducting the text, and/or treating physician. The identifier 99 may be formed into the sample container 90 so that it is integral or monolithic with the sample container. For instance, the identifier 99 may be formed in the sidewall 96 during manufacture, such as during molding. In another example, the identifier 99 may be etched into or deposited onto the sidewall 96. Alternatively, the identifier 99 may be attached to the sample container 90 with an adhesive or some other means. In this example, the identifier 99 may be added during manufacture or at the sample collection site.

Various types of sample containers may be used. In one instance, sample containers may be used in accordance with GP44, "Procedures for the Handling and Processing of Blood Specimens for Common Laboratory Tests," 4th Edition, published May 25, 2010 by the Clinical and Laboratory Standards Institute (CLSI), hereafter referred to as the "CLSI-GP44 standard." For instance, ethylenediaminetetraacetic acid (EDTA) tubes typically have a lavender cap and are used to stabilize whole blood for hematology determinations. EDTA containers must be inverted 10 times after collection to ensure proper mixing between whole blood and the K2EDTA anticoagulant. Another container type is lithium heparin gel containers. These containers typically have a mint green cap and are used to separate plasma from whole blood via centrifugation. These containers must be inverted 10 times after collection to ensure proper mixing between whole blood and the lithium heparin anticoagulant. Another container type is serum gel containers, which typically have a gold cap and are used to accelerate clotting and separate serum from whole blood via centrifugation. They must be inverted 5 times after collection to ensure proper mixing between whole blood and the clot activator they contain. Serum containers have a red top and are used to separate serum from whole blood via centrifugation. They do not need to be inverted after collection because they do not contain an additive. Any one of these container types may be used in the sample preparation device 10 as described herein.

Referring to FIGS. 1-3 and 5A-5C, once the sample container 90 is placed in the sample preparation module 20, the scanning module 60 is used to scan the identifier 99 of the sample container 90. The scanning module 60 may be any electronic device configured to scan and/or read a machine readable code. For instance, the scanning module 60 may be a bar code reader with a scanning unit (not shown) and a communications unit (not shown). The communications unit transmits the scanned identifier 99 to the controller. The scanning module 60 can also record a time that the sample container 90 is held by the sample preparation module 20. As shown, the scanning module 60 is integrated with the sample preparation device 10. However, in certain embodiments, the scanning module 60 can be a separate handheld unit, such as a smartphone or some other handheld reader. In such an example, the handheld computing device may include a camera that captures an image of the identifier. Software in the handheld unit can associate the captured information from the container with the stored information or a reference.

Continuing with FIGS. 1-3 and 5A-5C, the sample preparation module 20 is used to a) invert the sample container 90 and blood sample contained therein and b) place the sample container into the staging module 40. As illustrated best in FIG. 5A, the sample preparation module 20 has a holder 22 configured to hold the sample container 90 and an actuator 26 coupled to the holder 22 that moves the holder 22 into different positions in order invert the sample container 90. As shown, the holder 22 includes a housing 23 with an elongate receptacle 24 that extends through the housing 23. The housing 23 is operably coupled to a support 25. The support 25 can house the actuator 26. The housing may be a cylindrical structure (or some other shape) that include a receptacle 24 design to hold the sample container 90. Within the receptacle 24 a ridge (not numbered) may be to help secure the sample container 90 in place. The ridge, however, is also designed to allow release the sample container when in a certain orientation. The actuator 26 may be any device that can cause rotational motion of the holder 22 in response to command signals and/or instructions from the controller 80. As illustrated, the housing 22 rotates about a rotation axis R. In this embodiment, the rotation axis R is located at the approximate center or the housing 22. However, the rotation axis R is not required to be along the center of the housing 22. The receptacle 24 has length that is sufficient to hold an entirety of a sample container 90.

Figure 6:
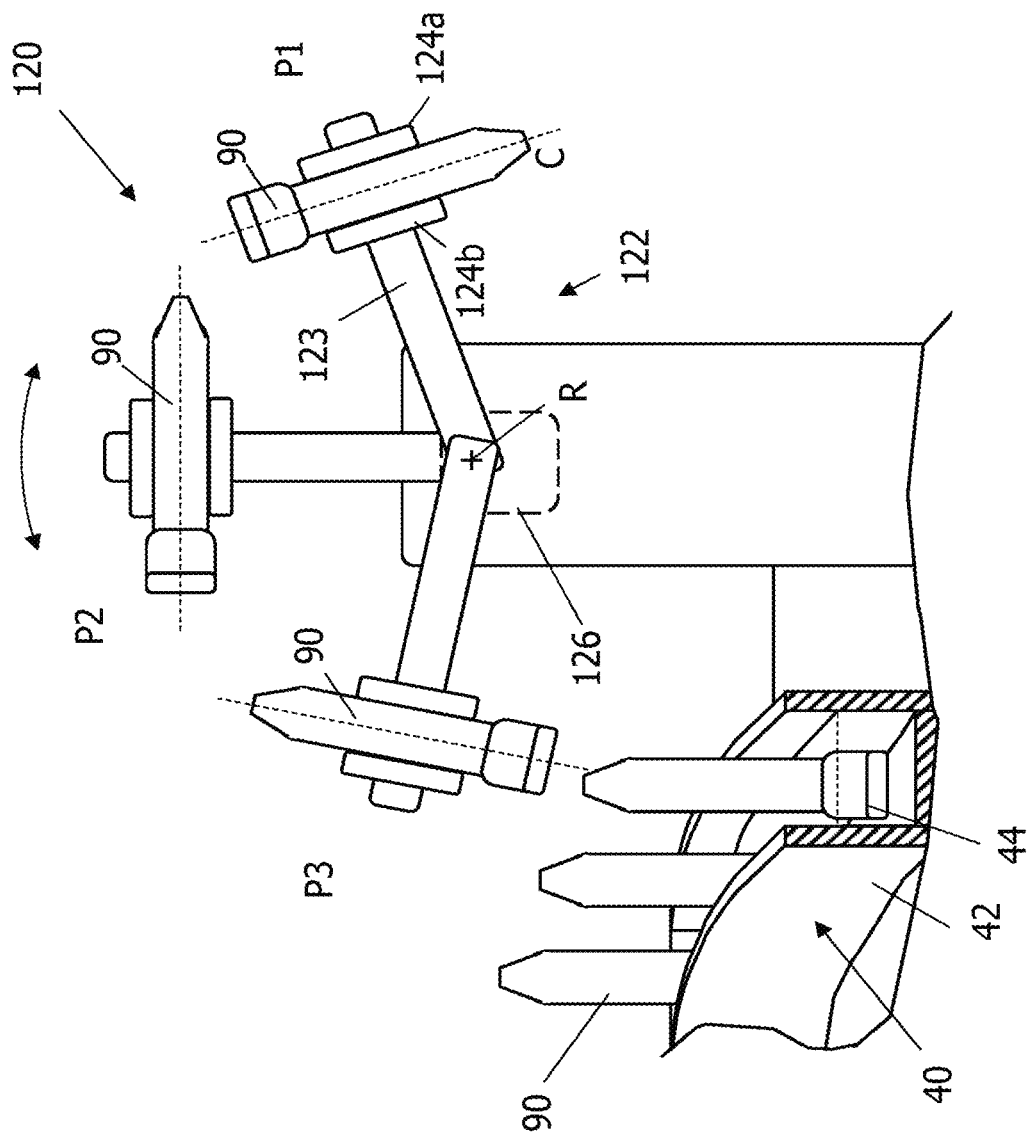
FIG. 6 is a schematic partial cross-section of a portion of the sample preparation device according to an alternative embodiment, illustrating inversion of the sample container and placement into the staging module.

Continuing with FIG. 6, the actuator 26 causes the holder 22 to repeatedly change a position of the sample container 90 a set number of times, such as by inverting the containers about the rotation axis R. Inverting the containers may be performed for several purposes, which may include: 1) initiate clotting by encouraging mixing of blood with coagulant, 2) prevent clotting by encouraging mixing of blood with anticoagulant, or 3) improve preservation by encouraging mixing of blood with preservative. Inversion is therefore used to encourage the mixing of the blood with an additive that may be present in the sample container.

Figure 5A:
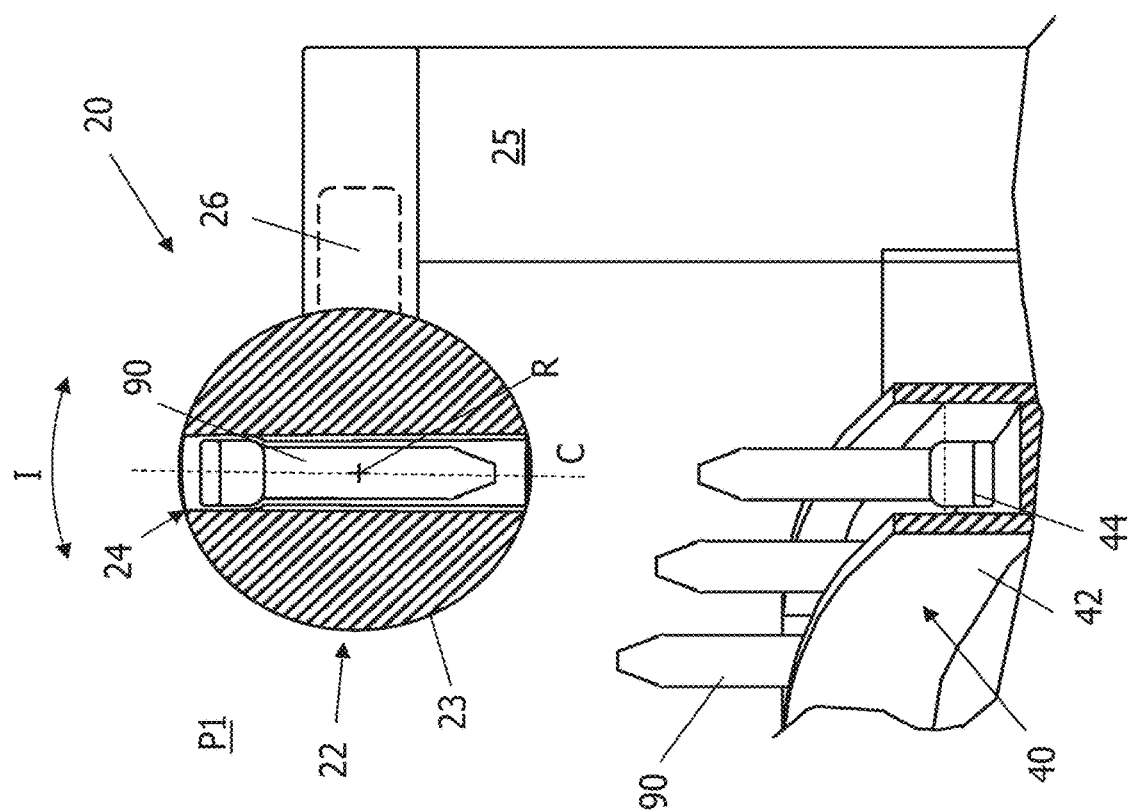
FIG. 5A is a schematic partial cross-section of a portion of the sample preparation device shown in in FIG. 1, illustrating the process of inverting the sample container and placement into the staging module.
Figure 7:
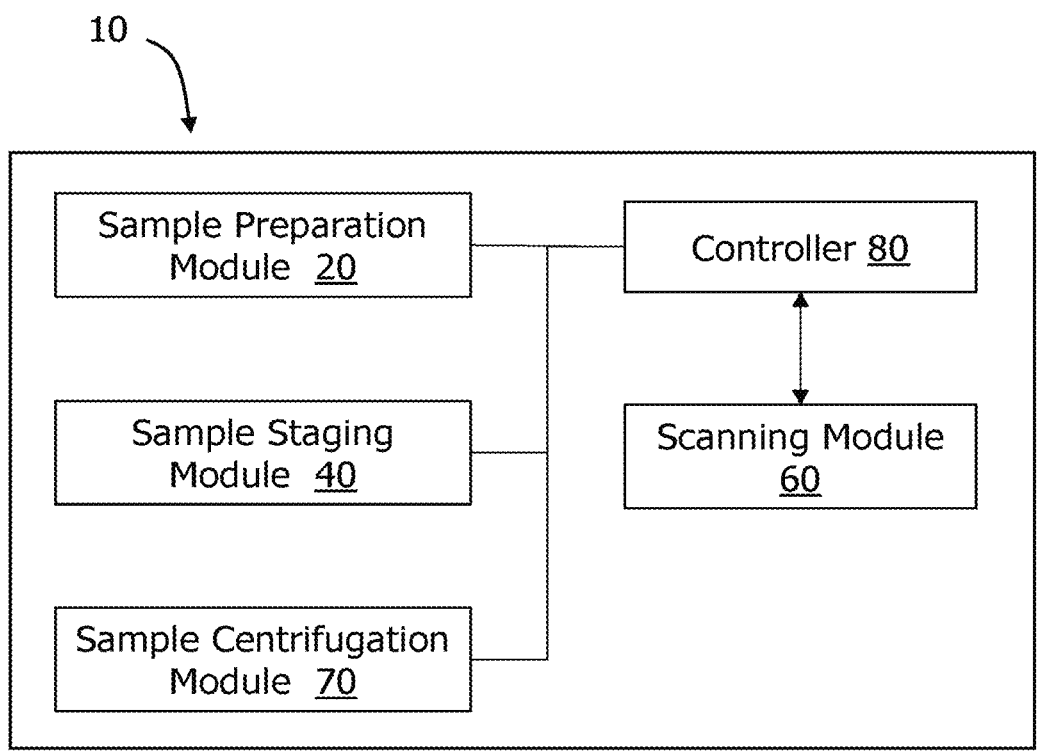
FIG. 7 is a schematic block diagram of the sample preparation device shown in FIG. 1, illustrating a control system used to control operation of the sample preparation device shown in in FIG. 1.

The sample preparation module 20 is configured to invert the sample container 90 and to also release the sample container. For example, FIG. 5A illustrates the holder 22 and sample container 90 in a first position PI set to receive the sample container 90 from the user. FIG. 5B illustrates the holder 22 rotated into a second P2 or an inverted position P2. The inverted position P2 is about 160 degrees offset from its initial position P1. However, the inversion may be more or less than about 160 degrees. The actuator 26 causes the holder 22 to repeatedly cycle through the first position P1 and the second (inverted) position P2 to invert the sample container 90. Progression of the sample container 90 through the first position P1 to the second position P2 and back to the first position P1 constitutes one cycle. One cycle is therefore a single instance of inversion. The phrase a "set number of times" therefore refers to a set number of cycles. The controller 80 (FIG. 7) actuates the actuator 26 in order to repeatedly change the position P1, P2 of the sample container 90 through one or more cycles. The actuator 26 may cause the holder 22 to invert the sample container 90 one cycle, two cycles, three cycles, or more. The number of cycles may be based on the type of sample container 90 and sample type. In one example, the controller 80 may be configured to invert the sample container 90 up to 10 or 20 cycles. More cycles may be used as needed.

As shown in FIGS. 5A and 5B, inversion of the sample container 90 through the cycle (or cycles) causes the container axis C to rotate around the rotation axis R. As shown, the rotation axis R is substantially angularly offset with respect to the central axis C. In one example, the rotation axis R is substantially perpendicular to the central axis C of the sample container 90. The rotation axis R need not be associated with the support 25. The rotation axis R can be located elsewhere so long as the axis C of the sample container 90 is angled (at 90 degrees or otherwise) relative to the rotation axis R. Thus, the sample container is rotated about the rotation axis R (at an angle) which is in contrast to simply rotating the sample container about the container axis C as is done in conventional tube rollers.

Turning now to FIG. 5C, the actuator 26 has caused the holder to rotate in to a releasing position RP. In the releasing position RP, a top end of the receptacle is flip and aligned with the staging module. In this position, the sample container 90 can drop in to the staging module for processing as will be described further below.

As illustrated, each holder 22 holds a single sample container 90. In alternative embodiments, the holder may hold a plurality of sample containers 90. Likewise, the actuator would be configured to repeatedly change the position of the plurality of sample containers 90 held by the holder 22. As shown, the holder is configured as a clamp. The holder 22 can have other configurations designed to hold the sample container 90. For instance, the holder may be a receptacle that securely holds an end of the sample container via press-fit connection. In still other embodiments, the actuator may be configured to repeatedly agitate the sample container 90 to repeatedly change the position of the sample container when the sample container is held by the holder. For example, in some cases, the actuator may agitate the sample container without specifically inverting the sample container 90 through the cycles as described above.

Turning now to FIG. 6, an alternative embodiment of the sample preparation module 120 is shown. For ease of description and illustration, the sample preparation module 120 shown in FIG. 6 has the same reference signs to identify features that are common with the sample preparation module 20 shown in FIGS. 5A-5C. As illustrated best in FIG. 6, the sample preparation module 120 has a holder 122 configured to hold the sample container 90 and an actuator 126 coupled to the holder 122 that moves the holder 122 into different positions in order invert the sample container 90. As shown, the holder 122 includes a post 123 and two grip members 124a and 124b between which the sample container 90 is held in place. The actuator 26 may be any device that can cause rotational motion of the holder 122 in response to command signals and/or instructions from the controller 80.

Continuing with FIG. 6, the actuator 126 causes the holder 22 to repeatedly change a position of the sample container 90 a set number of times. For example, FIG. 6 illustrates the holder 22 and sample container 90 in a first position P1, a second position P2, and optional to a third position P3. The actuator 126 causes the holder 122 to repeatedly cycle through the first position P1, the second position P2, and the third position P3 to invert the sample container 90. Progression of the sample container 90 through the first position P1, the second position P2, and the third position P3 and back to the first position PI constitutes one cycle. In certain causes, the third position P3 may be a release position as described above. The controller 80 actuates the actuator 126 in order to repeatedly change the position P1, P2 and P3 of the sample container 90 through one or more cycles (or one or more set number of times). Again, the number of cycles may be based on the type of sample container 90 and sample type. In one example, the controller 80 may be configured to invert the sample container 90 up to 10 or 20 cycles.

Continuing with FIG. 6, inversion of the sample container 90 through the cycle (or cycles) causes the container axis C to rotate around a rotation axis R located proximate to an end of the post 23. The rotation axis R is substantially angularly offset with respect to the central axis C. As illustrated, the rotation axis R is substantially perpendicular to the central axis C of the sample container 90.

As illustrated FIGS. 5A-6, each holder 22, 122 holds a single sample container 90. In alternative embodiments, the holder 22, 122 may hold a plurality of sample containers 90. Likewise, the actuator would be configured to repeatedly change the position of the plurality of sample containers 90 held by the holder 22, 122. As shown, the holder is configured as a clamp. The holder 22, 122 can have other configurations designed to hold the sample container 90. In still other embodiments, the actuator may be configured to repeatedly agitate the sample container 90 to repeatedly change the position of the sample container when the sample container is held by the holder. For example, in some cases, the actuator may agitate the sample container without specifically inverting the sample container 90 through the cycles as described above.

The sample preparation modules 20, 120 is therefore designed to automatically invert sample containers immediately after collection, which is unlike conventional sample preparation devices. Rather, these steps are conventionally performed manually by the person collecting blood, which causes numerous opportunities for error. Automating the inversion can ensure that each sample container is inverted the correct number of times based on its type. For instance, inversion can be performed in accordance the CLSI-GP44 standard. This automation also ensures that the speed and angle of inversion is not subject to differences in operator technique. Furthermore, the automated inversion also reduces the work and time required to collect blood.

When the required number of cycles (or agitation cycles) are complete, the controller 80 is further configured to cause the holder 22, 122 to release the sample container 90 into the staging module 40.

Figure 3:
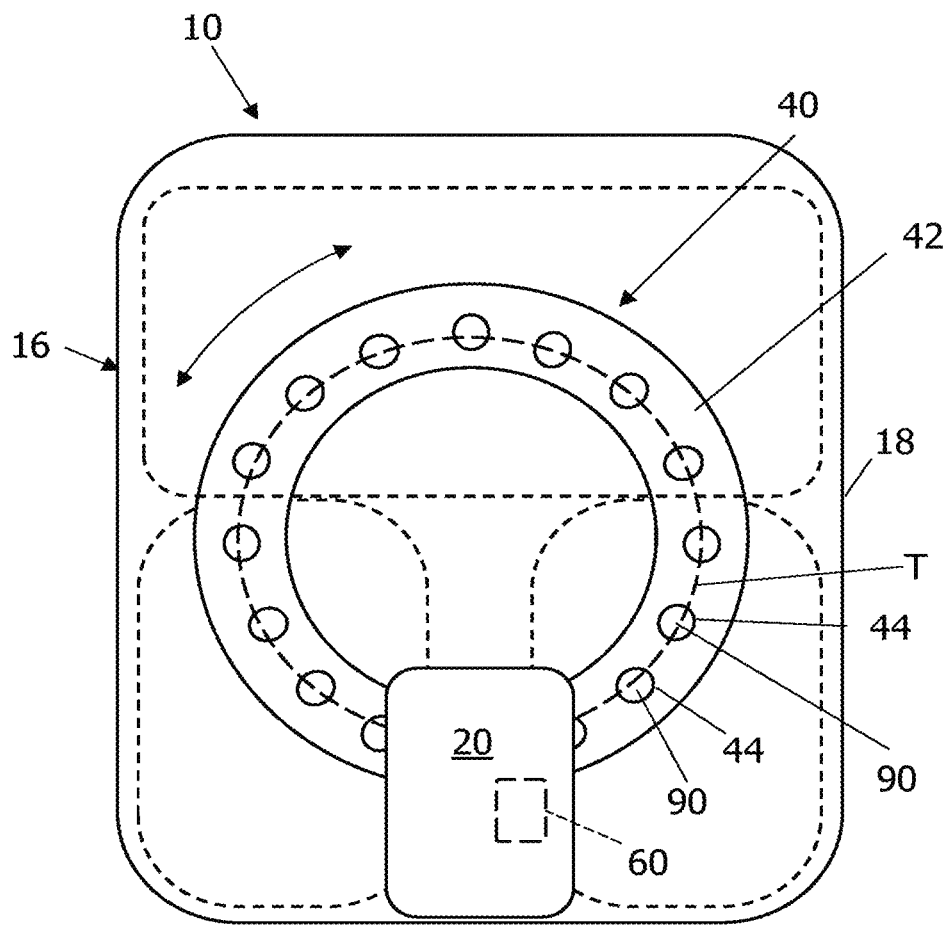
FIG. 3 is a top plan view of the sample preparation device shown in FIG. 1.

Referring back to FIGS. 3 and 5A-5C, the staging module 40 is configured to hold multiple sample containers 90 for a set period of time. Typically, the set period of time is sufficient to allow the blood in the sample container 90 to further clot, as further explained below. Referring to FIGS. 3 and 5C, the staging module includes a rack 42 that holds the sample container 90 when the sample container 90 is released from the holder 22. The rack 42 of the staging module includes a plurality of bays 44. Each bay 44 is configured to receive therein the lower end 92 of the sample container 90. As shown the plurality of bays are aligned along a curved axis T to define a circular shaped rack. In alternative embodiments, however, the rack may be linear such that the bays 44 are aligned along a linear axis (not shown). After the sample container 90 is placed in the rack 42, the controller 80 is also configured to monitor the time that the sample container 90 is held in the rack 42 of the staging module 40. The time the sample container is held in the rack 42 is measured from the time scanning module 60, which records the time the container is placed in the sample preparation device 10. Because the number of inversion cycles are known for each sample container 90, the time to complete the inversion cycles are also known, and the time the sample container 90 is in rack 42 can be monitored. In this regard, the controller 80 is configured to cause the release of the sample container 90 from the rack 42 of the staging module 40 when the set period of time has passed.

The set period of time monitored by the controller 80 in the staging module 40 is intended to match the approximate clotting time of a sample. The set period of time may differ based on the sample type, additive type, and environmental conditions. In one example, the set period of time may be up to 30 minutes. A typical staging time period may range between 20 minutes up to 60 minutes or more. One method of determining the set period of time is based on the CLSI-GP44 standard mentioned above. For instance, according to the CLSI-GP44 standard, the set period of time is intended to match the clotting time. For serum samples, the clotting time is 30-60 minutes at room temperature without an additive. In another example, for serum samples, the clotting time is 15-30 minutes when using glass or silica particles as a clot activator. In another example, for serum samples, the clotting time is 2-5 minutes when using snake venom or thrombin as a clot activator. The staging module 40 can release the sample container to one of the storage compartments 19a, 19b or to the centrifugation module 70. The controller 80 can operate the mechanized doors to direct the sample containers 90 to storage or to the centrifugation module 70. Whether or not a sample container 90 is stored or centrifuged is based on the sample type and the information encoded in the identifier 99 on the sample container 90.

The staging module 40 advantageously holds sample containers (e.g. for serum) for the set period of time prior to centrifugation. For example, the wait time for serum specimens is conventionally tracked manually and is often inconsistent. By automating the wait period and tracking the wait time for each individual sample container, the staging module 40 can ensure that all sample containers have enough time to clot consistently. It also ensures that sample containers do not wait unnecessarily beyond their required clotting time.

Figure 2:
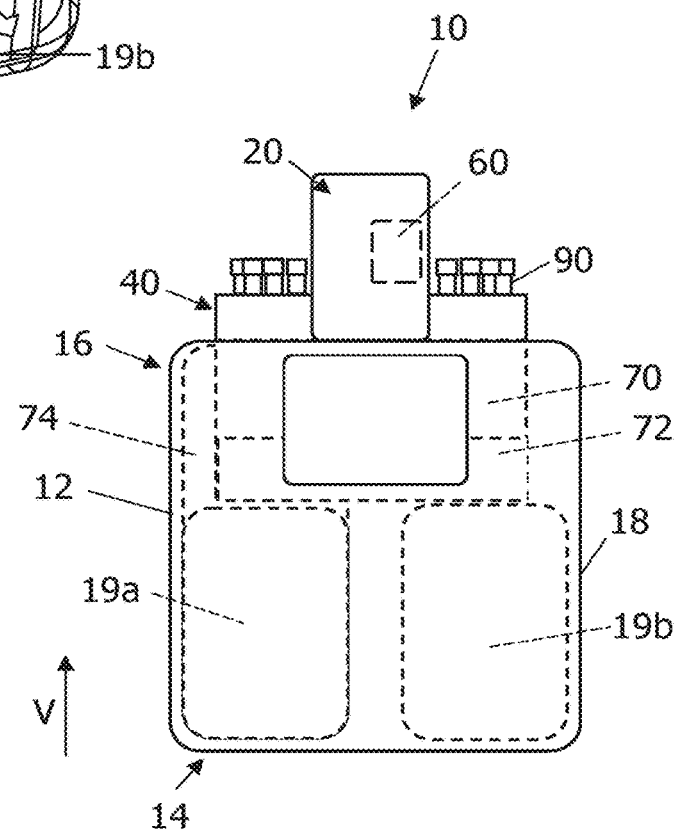
FIG. 2 is a front view of the sample preparation device shown in FIG. 1, with internal components illustrated in dashed lines.

Referring to FIGS. 1 and 2, the centrifugation module 70 is configured to centrifuge the sample containers 90. The centrifugation module 70 includes a rotor 72 in the device housing 12. The rotor 72 holds the sample containers 90. The centrifugation module 70 also includes a motor 74, which is communicatively coupled the controller 80. The motor 74 is a typical motor that causes rotation of the rotor 72. The controller 80 may utilize the centrifuge rotor 72 to index sample containers into the correct storage compartments. In conventional methods, sorting is either not done or is done manually. The sample preparation device 10 automates the process of sorting sample containers after collection. Unlike some conventional sorting devices, the sample preparation device may use the same rotor that is used for centrifugation to sort sample containers. In alternative embodiments, however, it is possible that separate rotors may be used for centrifugation and sorting. This, in turn, eliminates the need for a separate sorting mechanism. In one embodiment, the rotor 72 is configured for upright centrifugation. Either a single container can be centrifuged or multiple sample containers can be centrifuged. In still other embodiments, the centrifuge could be a swing-bucket centrifuge or a fixed-angle centrifuge. It could be a refrigerated centrifuge or a room temperature centrifuge. However, other centrifugation methods may be employed as needed.

Another embodiment of the present disclosure is a method for preparing a biological sample. In one example, the method uses the sample preparation device 10 (or device 120) described above to prepare and stabilize a blood sample close to or immediately following collection of the blood sample. Typically, a collection technician will use a collection device having a lancet to extract blood from the patient. The collection device may be used to place the blood sample into the desired sample container (e.g. sample container 90 above). In such an example, a micro-sample of blood is collected. In other embodiments, a needle may be used to collect larger amounts of blood. Thus, the device 10 and method described herein may be use for micro-samples and larger blood samples. The collection technician may access the sample preparation module 20 and place one or two containers (or more) in the holder 22 of the sample preparation module 20. Here, the method includes holding the sample container with a holder 22 of a sample preparation module 20.

At this point, a scanning module 60 may scan an identifier 99 on the sample container 90. As noted above, the identifier 99 contains information indicative of the type of sample container 90. The scanning module 60 transmits the time that the sample container 90 is gripped and information, such as sample ID, to the controller 80. At this point, the controller may determine which sample container 90 requires centrifugation. This determination may be based on the sample ID or other information encoded in the identifier 99.

Next, the method includes actuating the holder 22 while holding the sample container 90 to repeatedly change a position of the sample container 90. In one example, actuating the holder includes repeatedly inverting the sample container to repeatedly change the position of the sample container for one or more cycles. For instance, actuating the holder includes repeatedly inverting the sample container to repeatedly change the position of the sample container up to about 10 cycles (or times). More or less cycles may be used depending on the sample ID and intended test. In alternative embodiments, actuating the holder includes repeatedly agitating the sample container 90 to repeatedly change the position of the sample container. In still other embodiments, the method may also include, causing, via the controller 80, the actuator 26 to actuate the holder 22 based at least on a type of the sample container 90 held by the holder 22. The sample preparation device 10 therefore utilizes automated inversion, thereby removing errors associated with manual inversion. Furthermore, because the sample preparation device 10 has scanned the sample container's 90 identifier 99, the controller and related software knows what type of container it is and whether it needs to be inverted.

After inversion of the sample containers 90 is complete, the sample preparation module 20 causes the holder 22 to release the sample container 90 into the staging module 40 to initiate a clotting queue. The sample containers 90 may be staged in the staging module for a time sufficient to cause further clotting of the blood in the sample containers. In one example, a particular sample container 90 may be staged in the staging module for a set period of time (or staging time period). A typical staging time period may range between 20 minutes up to 60 minutes or more. In one example, the set period of time may be up to 30 minutes. As discussed above, according to the CLSI-GP44 standard, the set period of time is intended to match the clotting time. For serum samples, the clotting time is 30-60 minutes at room temperature without an additive. In another example, for serum samples, the clotting time is 15-30 minutes when using glass or silica particles as a clot activator. In another example, for serum samples, the clotting time is 2-5 minutes when using snake venom or thrombin as a clot activator. The staging module 40 can release the sample container to one or the storage compartments 19a, 19b or to the centrifugation module 70. The controller 80 can operate the mechanized doors to direct the sample containers 90 to storage or to the centrifugation module 70. The controller monitors the time that the sample container 90 is held by a rack 42 of the staging module 40.

The method includes releasing the sample container 90 from the rack 42 of the staging module 40 when the set period of time has passed. Because the sample preparation device 10 has scanned the container's identifier 99, the controller also knows whether the sample container is a serum sample and whether it needs to wait prior to centrifugation. In one example, the controller 80 determines which sample container should be centrifuged. In response to that determination, the controller 80 causes the staging module 40 to route the sample container 90 to the centrifugation module 70. Then, the centrifugation module 70 centrifuges the sample held within the sample container 90. Because the sample preparation device 10 has scanned the container's identifier 99, the controller also knows the approximate force and time the sample need to be centrifuged. The force and time may be different depending on the type of the sample container 90. The device may bypass centrifugation altogether if it determines that the sample container does not require centrifugation.

Thereafter, the sample containers are routed to the appropriate storage compartments. Alternatively, after staging on the staging module is complete, for those samples where centrifugation is not required, the controller 80 causes the staging module 40 to route the sample container 90 to one or more storage compartments. The information obtained from the scanning module is used by the controller to determine where the sample container should be stored. The controller 80 can use the centrifuge rotor to position the sample container 90 above the correct storage compartment and drop the sample container in the compartment. The sample preparation device 10 may store sample containers in the compartments with a specific orientation or organization. For example, it could store sample containers upright in a rack or it could store containers horizontally in a magazine. The controller 80 is configured to manage the index positions and elapsed time a container 90 is in the staging module 40. Once the sample containers 90 are deposited into the compartments, the user may retrieve the sample containers for the required testing.

While the present disclosure is described herein using a limited number of embodiments, these specific embodiments are not intended to limit the scope of the disclosure as otherwise described and claimed herein. Modification and variations from the described embodiments exist. It should be understood that the invention is not limited to the specific details set forth in the examples.

The invention claimed is:

1. A method for preparing a whole blood sample, comprising:
    receiving at a sample preparation machine, a sample container containing the whole blood sample, the sample container including a tube having an open end and a closed end, and a cap secured to the open end of the tube;
    scanning, using the machine, an identifier of the sample container, the identifier containing information indicative of a characteristic of at least one of the sample container or the whole blood sample contained therein;
    after the scanning, with the machine, and based on the information, actuating the sample container to repeatedly change a position of the sample container;
    determining, with the machine and based on the information, whether the sample container should be centrifuged;
    after the actuating, lowering the specimen container in an inverted orientation into a bay of a rack of the machine, the cap being disposed below the closed end of the tube when the sample container is in the inverted orientation;
    after the lowering and with the specimen container disposed within the bay of the rack, transporting the sample container in the inverted orientation within the bay to a centrifuge to be centrifuged when the determining indicates that the sample container should be centrifuged, and to a storage compartment without entering the centrifuge when the determining indicates that the sample container should not be centrifuged.

2. The method of claim 1, wherein the actuating the sample container includes repeatedly changing the position of the sample container a set number of times based on the information.

3. The method of claim 1, further comprising: recording a time that the sample container is received.

4. The method of claim 1, further comprising: after the scanning and before the actuating, holding the sample container for a set amount of time based on the information.

5. The method of claim 1, wherein the actuating includes inverting the sample container while retaining the sample container with a holder of an actuator of the machine, and the lowering the specimen container includes dropping the specimen container from the holder such that the specimen container is at least partially lowered via gravity into the bay of the rack.

6. The method of claim 1, wherein the actuating causes the whole blood sample to mix with an additive contained within the sample container.

7. The method of claim 1, wherein the storage compartment is refrigerated.

8. The method of claim 1, wherein scanning the identifier of the sample container includes reading a barcode on the sample container.

9. The method of claim 1, wherein the transporting includes transporting the sample container in the inverted orientation along a curved axis to deliver the sample container to the centrifuge or the storage compartment.

10. The method of claim 1, wherein the actuating the sample container includes repeatedly changing a position of the sample container a set number of times about a rotation axis, the rotation axis being offset a non-zero distance from a central axis of the sample container during the actuating.

11. The method of claim 1, wherein the information contained in the identifier includes encoded instructions disposed on the sample container.

12. The method of claim 1, wherein instructions regarding whether the sample container should be centrifuged are stored external to the sample preparation machine,
    the identifier being associated with those instructions such that the actuating based on the information and the determining based on the information are each based on the sample preparation machine accessing those instructions stored external to the sample preparation machine.

13. The method of claim 1, wherein centrifuging the sample container includes separating serum or plasma from blood cells in the whole blood sample.

14. The method of claim 1, wherein transporting the sample container to the centrifuge when the determining indicates that the sample container should be centrifuged includes transporting the sample container to a first rotor of the centrifuge to be centrifuged, and then to a storage compartment using a second rotor, the first rotor being different from the second rotor, the centrifuging occurring during a time period, and the sample container being the only sample container centrifuged by the machine during the time period.

15. The method of claim 1, wherein transporting the sample container to the centrifuge includes dropping the sample container in the inverted orientation into a rotor of the centrifuge.

16. The method of claim 1, wherein the transporting the sample container to the centrifuge includes lowering the sample container into a rotor of the centrifuge.

17. The method of claim 1, wherein the lowering the specimen container includes dropping the specimen container in the inverted orientation into the bay to be transported to the centrifuge or to the storage compartment without entering the centrifuge.

18. The method of claim 1, wherein the actuating includes actuating the sample container while retaining the sample container with a holder, the method further comprising:
    after the actuating, and with the holder, aligning the sample container in the inverted orientation with the bay of a rack; and
    after the aligning, releasing the sample container from the holder such that via gravity the sample container drops the sample container into the bay of the rack.

19. The method of claim 1, wherein the receiving the sample container includes receiving the sample container in an up-right orientation.

20. The method of claim 1, wherein the receiving the sample container includes receiving the sample container within a holder of an actuator of the sample preparation machine, the actuating including actuating the sample container with the sample container within the holder of the actuator, the lowering the specimen container including releasing the specimen container from within the holder while the holder is aligned with the bay of the rack.

21. The method of claim 20, wherein the holder is configured to hold only one specimen container at a time.

22. The method of claim 1, wherein the receiving includes receiving the sample container in an up-right orientation at a first position, the actuating including inverting the sample container to an inverted orientation while moving the sample container to a second position that is laterally offset from the first position, the lowering the specimen container including releasing the sample container from the second position.

23. The method of claim 1, wherein the sample container is a first sample container and the bay of the rack is a first bay, the rack including a plurality of bays including the first bay such that the rack can hold and transport multiple sample containers including the first sample container.

24. A method for preparing a whole blood sample, comprising:

scanning, using a sample preparation machine, an identifier of a sample container containing a whole blood sample while the sample container is in an up-right orientation, the sample container including a tube having an open end and a closed end, the closed end being disposed above the open end when the sample container is in the up-right orientation, the identifier containing information indicative of a characteristic of at least one of the sample container, the whole blood sample contained therein or an identity of a donor of the whole blood sample;

after the scanning, with an actuator of the machine and based on the information, actuating the sample container to repeatedly change a position of the sample container about a rotation axis between a first position in which the sample container is in the upright orientation and a second position in which the sample container is in an inverted orientation, the rotation axis being offset a non-zero distance from a central axis of the sample container during the actuating; and after the actuating and with the sample container in the second position, based on the information and with the machine, dropping the sample container in the inverted orientation from the actuator into a rack of the machine such that the rack can transport the sample container in the inverted orientation to a centrifuge to be centrifuged, and then to a storage compartment.

25. The method of claim 24, wherein the actuating includes inverting the sample container.

26. The method of claim 24, wherein the actuating causes the whole blood sample to mix with an additive contained within the sample container.

27. The method of claim 24, wherein scanning the identifier of the sample container includes reading a barcode on the sample container.

28. The method of claim 24, wherein the sample container includes a cap secured to the tube, the cap being disposed below the closed end of the tube when the sample container is in the inverted orientation.

29. The method of claim 24, wherein the storage compartment is refrigerated.

* * * * *